US010069591B2

(12) United States Patent
Shellhammer

(10) Patent No.: US 10,069,591 B2
(45) Date of Patent: Sep. 4, 2018

(54) METHOD AND APPARATUS FOR DISTRIBUTED SPECTRUM SENSING FOR WIRELESS COMMUNICATION

(75) Inventor: Stephen J. Shellhammer, Ramona, CA (US)

(73) Assignee: QUALCOMM Incorporated, San Diego, CA (US)

(*) Notice: Subject to any disclaimer, the term of this patent is extended or adjusted under 35 U.S.C. 154(b) by 1811 days.

(21) Appl. No.: 11/969,875

(22) Filed: Jan. 4, 2008

(65) Prior Publication Data
US 2009/0143019 A1 Jun. 4, 2009

Related U.S. Application Data

(60) Provisional application No. 60/883,429, filed on Jan. 4, 2007.

(51) Int. Cl.
H04K 3/00 (2006.01)
H04B 17/24 (2015.01)
H04B 17/327 (2015.01)
H04W 8/00 (2009.01)

(52) U.S. Cl.
CPC ............ H04K 3/226 (2013.01); H04B 17/24 (2015.01); H04B 17/327 (2015.01); H04W 8/005 (2013.01)

(58) Field of Classification Search
USPC ...................................... 455/67.11
See application file for complete search history.

(56) References Cited

U.S. PATENT DOCUMENTS

| 3,668,525 A | 6/1972 | McGraw |
| 4,079,380 A | 3/1978 | Esry et al. |
| 4,098,110 A | 7/1978 | Bowden |
| 4,745,479 A | 5/1988 | Waehner |
| 5,098,110 A | 3/1992 | Yang |
| 5,278,647 A | 1/1994 | Hingorani et al. |
| 5,416,521 A | 5/1995 | Chujoh et al. |
| 5,668,948 A | 9/1997 | Belknap et al. |
| 5,678,172 A | 10/1997 | Dinkins |

(Continued)

FOREIGN PATENT DOCUMENTS

| CN | 1264529 A | 8/2000 |
| CN | 1536784 A | 10/2004 |

(Continued)

OTHER PUBLICATIONS

Federal Communication Commission, in the Matter of Unlicensed Operation in the TV Broadcast Band, Additional Spectrum for Unlicensed Devices Below 900 MHZ and in the 3GHZ Band—First Report and Order and Further Notice of Proposed Rulemaking, FCC 06-156, Oct. 18, 2006.

(Continued)

Primary Examiner — Hsin-Chun Liao
(74) Attorney, Agent, or Firm — Muncy, Geissler, Olds & Lowe, P.C.

(57) ABSTRACT

Methods and apparatus for determining if a signal of interest, for example, a licensed signal having or exceeding a predetermined field strength, is present in a wireless spectrum and/or which facilitates such a determination are described. The signal of interest maybe, e.g., a television signal or a wireless microphone signal using licensed television spectrum. The predetermined field strength may be specified or by a government regulation or rule.

5 Claims, 10 Drawing Sheets

(56) References Cited

U.S. PATENT DOCUMENTS

| | | |
|---|---|---|
| 5,751,280 A | 5/1998 | Abbott et al. |
| 5,754,353 A * | 5/1998 | Behrens et al. ............... 360/53 |
| 5,970,390 A | 10/1999 | Koga et al. |
| 5,977,804 A | 11/1999 | Beech |
| 6,009,237 A | 12/1999 | Hirabayashi et al. |
| 6,044,270 A | 3/2000 | Raith |
| 6,058,118 A | 5/2000 | Rault et al. |
| 6,201,966 B1 | 3/2001 | Rinne et al. |
| 6,556,585 B1 | 4/2003 | Moulsley |
| 6,563,896 B1 | 5/2003 | Nomura et al. |
| 6,621,528 B1 | 9/2003 | Kessler et al. |
| 6,686,957 B1 | 2/2004 | Johnson et al. |
| 6,788,710 B1 | 9/2004 | Knutson et al. |
| 6,895,544 B1 | 5/2005 | Park et al. |
| 6,914,637 B1 | 7/2005 | Wolf et al. |
| 7,068,724 B1 | 6/2006 | Hamilton |
| 7,075,982 B2 | 7/2006 | Koto |
| 7,212,570 B2 | 5/2007 | Akiyama et al. |
| 7,254,191 B2 | 8/2007 | Sugar et al. |
| 7,269,304 B2 | 9/2007 | Lee et al. |
| 7,274,661 B2 | 9/2007 | Harrell et al. |
| 7,391,809 B2 | 6/2008 | Li et al. |
| 7,483,717 B2 | 1/2009 | Champion et al. |
| 7,532,643 B2 | 5/2009 | Teng |
| 7,903,550 B2 | 3/2011 | Schmidt et al. |
| 8,493,834 B2 | 7/2013 | Walker et al. |
| 8,958,475 B2 | 2/2015 | Raveendran |
| 2002/0012395 A1 | 1/2002 | Song et al. |
| 2003/0018800 A1 | 1/2003 | Paila et al. |
| 2003/0032392 A1 | 2/2003 | Suzuki |
| 2003/0093364 A1 * | 5/2003 | Bae et al. ............... 705/37 |
| 2003/0195977 A1 | 10/2003 | Liu et al. |
| 2004/0010729 A1 | 1/2004 | Lockridge et al. |
| 2004/0047324 A1 | 3/2004 | Diener |
| 2004/0259548 A1 | 12/2004 | Moon et al. |
| 2005/0008074 A1 | 1/2005 | Van Beek et al. |
| 2005/0078756 A1 | 4/2005 | Narita |
| 2005/0083873 A1 | 4/2005 | Yamamoto |
| 2005/0088074 A1 | 4/2005 | Yoon et al. |
| 2005/0191965 A1 | 9/2005 | Yu et al. |
| 2005/0213602 A1 | 9/2005 | Redi |
| 2005/0259623 A1 | 11/2005 | Garudadri et al. |
| 2006/0039483 A1 | 2/2006 | Lee et al. |
| 2006/0084444 A1 | 4/2006 | Kossi et al. |
| 2006/0133305 A1 | 6/2006 | Patwardhan et al. |
| 2006/0153148 A1 | 7/2006 | Bichot et al. |
| 2006/0171353 A1 | 8/2006 | Nagata et al. |
| 2006/0223467 A1 | 10/2006 | Mason |
| 2007/0074267 A1 | 3/2007 | Clerget et al. |
| 2007/0195893 A1 | 8/2007 | Kim et al. |
| 2007/0253394 A1 | 11/2007 | Horiguchi et al. |
| 2008/0014880 A1 | 1/2008 | Hyon et al. |
| 2008/0086286 A1 | 4/2008 | Shellhammer |
| 2008/0146159 A1 | 6/2008 | Faltman et al. |
| 2008/0152003 A1 | 6/2008 | Oguz |
| 2008/0165754 A1 | 7/2008 | Hu |
| 2008/0232294 A1 | 9/2008 | Ulupinar et al. |
| 2008/0261639 A1 | 10/2008 | Sun et al. |
| 2008/0285579 A1 | 11/2008 | Vare et al. |
| 2008/0298654 A1 | 12/2008 | Roth et al. |
| 2009/0054020 A1 | 2/2009 | Mason |
| 2009/0102981 A1 | 4/2009 | Mody |
| 2009/0147859 A1 | 6/2009 | McGowan et al. |
| 2009/0161610 A1 | 6/2009 | Kang et al. |
| 2009/0163225 A1 | 6/2009 | Haghighi et al. |
| 2009/0235316 A1 | 9/2009 | Wu et al. |
| 2009/0247201 A1 | 10/2009 | Ye et al. |
| 2009/0263105 A1 | 10/2009 | Sato et al. |
| 2009/0279626 A1 | 11/2009 | Wang |
| 2010/0013855 A1 | 1/2010 | Allen et al. |
| 2010/0110997 A1 | 5/2010 | Erceg et al. |
| 2011/0002377 A1 | 1/2011 | Raveendran |
| 2011/0002378 A1 | 1/2011 | Raveendran |
| 2011/0002379 A1 | 1/2011 | Raveendran |
| 2011/0002399 A1 | 1/2011 | Raveendran |
| 2011/0002405 A1 | 1/2011 | Raveendran |
| 2011/0182257 A1 | 7/2011 | Raveendran et al. |
| 2012/0224617 A1 | 9/2012 | Feher |

FOREIGN PATENT DOCUMENTS

| | | |
|---|---|---|
| CN | 1788516 A | 6/2006 |
| CN | 101053165 A | 10/2007 |
| CN | 101127903 A | 2/2008 |
| CN | 101142772 A | 3/2008 |
| EP | 0725489 A1 | 8/1996 |
| EP | 0892571 | 1/1999 |
| EP | 1467589 | 10/2004 |
| EP | 1478197 | 11/2004 |
| JP | H07107558 A | 4/1995 |
| JP | H0865188 A | 3/1996 |
| JP | H10191331 A | 7/1998 |
| JP | H1188945 A | 3/1999 |
| JP | H11122129 A | 4/1999 |
| JP | 2000083216 A | 3/2000 |
| JP | 2000196967 A | 7/2000 |
| JP | 2001308876 A | 11/2001 |
| JP | 2002527995 A | 8/2002 |
| JP | 2002538697 A | 11/2002 |
| JP | 2004297316 A | 10/2004 |
| JP | 2004312635 A | 11/2004 |
| JP | 2004320302 A | 11/2004 |
| JP | 2005057710 A | 3/2005 |
| JP | 2005079738 A | 3/2005 |
| JP | 2005175611 A | 6/2005 |
| JP | 2005244991 A | 9/2005 |
| JP | 2006074647 A | 3/2006 |
| JP | 2006128812 A | 5/2006 |
| JP | 2006526312 A | 11/2006 |
| JP | 2007006349 A | 1/2007 |
| JP | 2007060410 A | 3/2007 |
| JP | 2007096665 A | 4/2007 |
| JP | 2007134896 A | 5/2007 |
| JP | 2007184850 A | 7/2007 |
| JP | 2007300419 A | 11/2007 |
| JP | 2008079280 A | 4/2008 |
| JP | 2008533913 A | 8/2008 |
| JP | 2008211583 A | 9/2008 |
| JP | 2008289056 A | 11/2008 |
| JP | 2010522523 A | 7/2010 |
| JP | 2012532515 A | 12/2012 |
| KR | 20000038176 A | 7/2000 |
| KR | 20030013517 A | 2/2003 |
| KR | 20050071571 | 7/2005 |
| TW | 200826576 A | 6/2008 |
| WO | WO-9904590 A1 | 1/1999 |
| WO | 0022783 A1 | 4/2000 |
| WO | 0051390 A1 | 8/2000 |
| WO | WO03005719 A2 | 1/2003 |
| WO | 2004051868 A2 | 6/2004 |
| WO | 2004100587 A1 | 11/2004 |
| WO | WO-2005114943 A2 | 12/2005 |
| WO | 06020405 | 2/2006 |
| WO | 06051509 | 5/2006 |
| WO | 2006101801 A2 | 9/2006 |
| WO | WO-07047755 | 4/2007 |
| WO | WO2007043827 A1 | 4/2007 |
| WO | WO-2007049609 A1 | 5/2007 |
| WO | WO-2008027815 A2 | 3/2008 |
| WO | WO-2008039872 A2 | 4/2008 |
| WO | WO-2008061044 A2 | 5/2008 |
| WO | WO-2008072441 A1 | 6/2008 |
| WO | 08118882 | 10/2008 |
| WO | 2008129660 A1 | 10/2008 |
| WO | WO2008155598 A1 | 12/2008 |
| WO | 2009073819 A1 | 6/2009 |

OTHER PUBLICATIONS

IEEE 802.11; Part 11: Wireless LAN Medium Access Control (MAC) and Physical Layer (PHY) Specifications (Revision of IEEE STD 802.11-1999) (2007).

(56) References Cited

OTHER PUBLICATIONS

IEEE 802.22-05/0007R48, C.R. Stevenson, C. Cordeiro, E. Sofer and G. Chouinard, Functional Requirements for the 802.22 WRAN Standards, Nov. 2006.
IEEE 802.22-06/28R10, Steve Shellhammer, Victor Tawil, Gerald Chouinard, Max Muterspaugh and Monisha Ghosh, Spectrum Sensing Simulation Model, Sep. 2006.
IEEE P802.22/D0.1, Draft Standard for Wireless Regional Area Networks Part 22: Cognitive Wireless RAN Medium Access Control (MAC) and Physical Layer (PHY) Specifications: Policies and Procedures for Operation in the TV Bands, Working Document Towards a Draft Version 0.1, May 2006.
International Search Report—PCT/US08/050325, International Search Authority—European Patent Office—dated Jun. 23, 2008.
Written Opinion—PCT/US08/050325, International Search Authority—European Patent Office—dated Jun. 23, 2008.
Federal Communications Commission, FCC 08-260, "In the Matter of Unlicensed Operation in the TV Broadcast Bands, Additional Spectrum for Unlicensed Devices Below 900 MHz and in the 3 GHz Band." Second Report and Order and Memorandum Opinion and Order, released Nov. 14, 2008.
Hur et al., "A Cognitive Radio (CR)-based Mobile Interactive Digital Broadcasting Application adopting a Multi-Resolution Spectrum-Sensing (MRSS) Technique," IEEE, 5 pages, 2007.
International Search Report—PCT/US2010/040896—International Search Authority, European Patent Office, dated Feb. 17, 2011.
International Search Report and Written Opinion—PCT/US2011/022520—ISA/EPO—dated Apr. 15, 2011.
Laar Van De F et al.,"General-Purpose and Application-Specific Design of a DAB Channel Decoder", EBU Review—Technical, European Broadcasting Union. Brussels, BE, No. 258, Dec. 21, 1993 (Dec. 21, 1993), pp. 25-35, XP000435122.
Raveendran, U.S. Appl. No. 12/829,274, filed Jul. 1, 2010.
Raveendran, U.S. Appl. No. 12/829,280, filed Jul. 1, 2010.
Raveendran, U.S. Appl. No. 12/829,293, filed Jul. 1, 2010.
Raveendran, U.S. Appl. No. 12/829,302, filed Jul. 1, 2010.
Raveendran, U.S. Appl. No. 12/829,321, filed Jul. 1, 2010.
Shellhammer et al., "Technical Challenges for Cognitive Radio in the TV White Space Spectrum"; Information Theory and Applications Workshop, 2009, Feb. 2009.
Stevenson C et al: "IEEE 802.22: The first cognitive radio wireless regional area network standard", IEEE Communications Magazine, IEEE Service Center, Piscataway, US, vol. 44, No. 1, Jan. 1, 2009 (Jan. 1, 2009), pp. 130-138, XP011250000, ISSN: 0163-6804.
Laar Van De F, et al., "General-Purpose and Application-Specific Design of a DAB Channel Decoder", EBU Review—Technical, European Broadcasting Union. Brussels, BE, No. 258, Dec. 21, 1993 (Dec. 21, 1993).
Claudio R. C. M. Da Silva et al.: "Distributed Spectrum Sensing for Cognitive Radio Systems" Information Theory and Applications workshop, 2007;Jan. 1, 2007;retrieved from http:/citeseerx.ist.psu.edu/viewdoc/download"doi=10.1.1.1296203.pdf, downloaded on Sep. 13, 2011 the whole document.
Singapore Search Report—SG200903844-9—Intellectual Property Office of Singapore—dated Sep. 13, 2011.
Hu W., et al.,"IEEE P802.22—Wireless RANs—IEEE 802.22 Wireless RAN Standard PHY and MAC Proposal", XP007902891, Nov. 2005, URL: http://www.ieee802.org/22/Meeting_documents/2006_Jan/22-05-0098-01-0000_STM-Runcom_PHY-MAC_Outline.doc.
European Search Report—EP17178864—Search Authority—Munich—dated Oct. 20, 2017.

\* cited by examiner

METHOD AND APPARATUS FOR DISTRIBUTED SPECTRUM SENSING FOR WIRELESS COMMUNICATION

RELATED APPLICATIONS

This application claims the benefit of U.S. Provisional Patent Application Ser. No. 60/883,429 filed Jan. 4, 2007 which is assigned to the assignee of the present application and which is hereby expressly incorporated by reference.

FIELD

Various aspects relate to communications systems and, more particularly, to methods and apparatus for determining if a signal of interest, for example, a licensed signal having or exceeding a predetermined field strength, is present in a wireless spectrum and/or which facilitates such a determination.

BACKGROUND

Recently, the Federal Communications Commission (FCC) proposed new rules that would allow unlicensed cognitive radios to operate in geographically unused television (TV) channels. While the new rules may introduce numerous channels for use by the cognitive radios, several licensed transmissions occupy the TV channels including analog TV, digital TV, and professional wireless microphones. If any of these licensed transmissions is present above a certain power threshold, then the TV channel is deemed to be occupied; otherwise, the TV channel is deemed to be unoccupied and hence available for unlicensed wireless use. Thus, there is a need for methods and apparatus for determining if a signal of interest, for example, a licensed signal, such as a television broadcast signal having or exceeding a predetermined field strength, is present in a wireless spectrum and/or which facilitates such a determination.

SUMMARY

Methods and apparatus for determining if a signal of interest, for example, a licensed signal having or exceeding a predetermined field strength, is present in a wireless spectrum and/or which facilitates such a determination are described.

The signal of interest maybe, e.g., a television signal or a wireless microphone signal using licensed television spectrum. The predetermined field strength may be specified or by a government regulation or rule.

The system may include multiple stations, e.g., wireless terminals which make signal measurements and determinations regarding the presence of the signal of interest based on one or more signal measurements. The decisions are reported, in some embodiments, to a station, e.g., control node, which processes the decisions and/or other information provided by the various terminals to make a decision with regard to the presence or absence of the signal of interest. Measurements may include field strength measurements. When field strength measurements are referred to herein it should be appreciated that electromagnetic field strength measurements are being referred to. Field strength measurements may be based on, e.g., on the power of a received signal of interest and knowledge of the antenna used to receive the signal of interest.

In accordance with some but not necessarily all aspects, terminals report not only their decision but also a confidence measure corresponding to their decision to the control node. The confidence measure may be used in the processing of the individual decisions to make the decision in the control node as to whether or not the signal of interest is present. The use of decisions from multiple nodes along with confidence information allows for a more reliable decision at the control node than might be made by any one of the individual wireless terminals.

In some but not all aspects, the terminals report field strength information to the control node. In addition reliability of the field strength information may be communicated to the control node. Messages are used for communicating the decisions, confidence information, field strength information and reliability information to the control node. Different messages or a single message may be used to communicate the information from the terminal to the control node.

The control node may, in accordance with some but not necessarily all aspects, send one or more control messages. The control messages may be directed to individual wireless terminals providing signal detection results or included in a broadcast message broadcast to multiple wireless terminals which are to be controlled using the same set of control information. Detection thresholds and/or sensing techniques to be used may be communicated in the control messages sent to the terminals. Explicit thresholds may be communicated or false alarm rate information, which can be used by the receiving terminal to determine the threshold to be used, may be communicated.

While the node which receives the information and/or decisions from multiple wireless terminals and then makes the determination as to whether or not a signal of interest is present from the information and/or decisions received from multiple devices has been described as a control node for purposes of explaining the invention, the node need not provide control functions and may simply make determinations based on multiple received signals depending on the particular embodiment.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
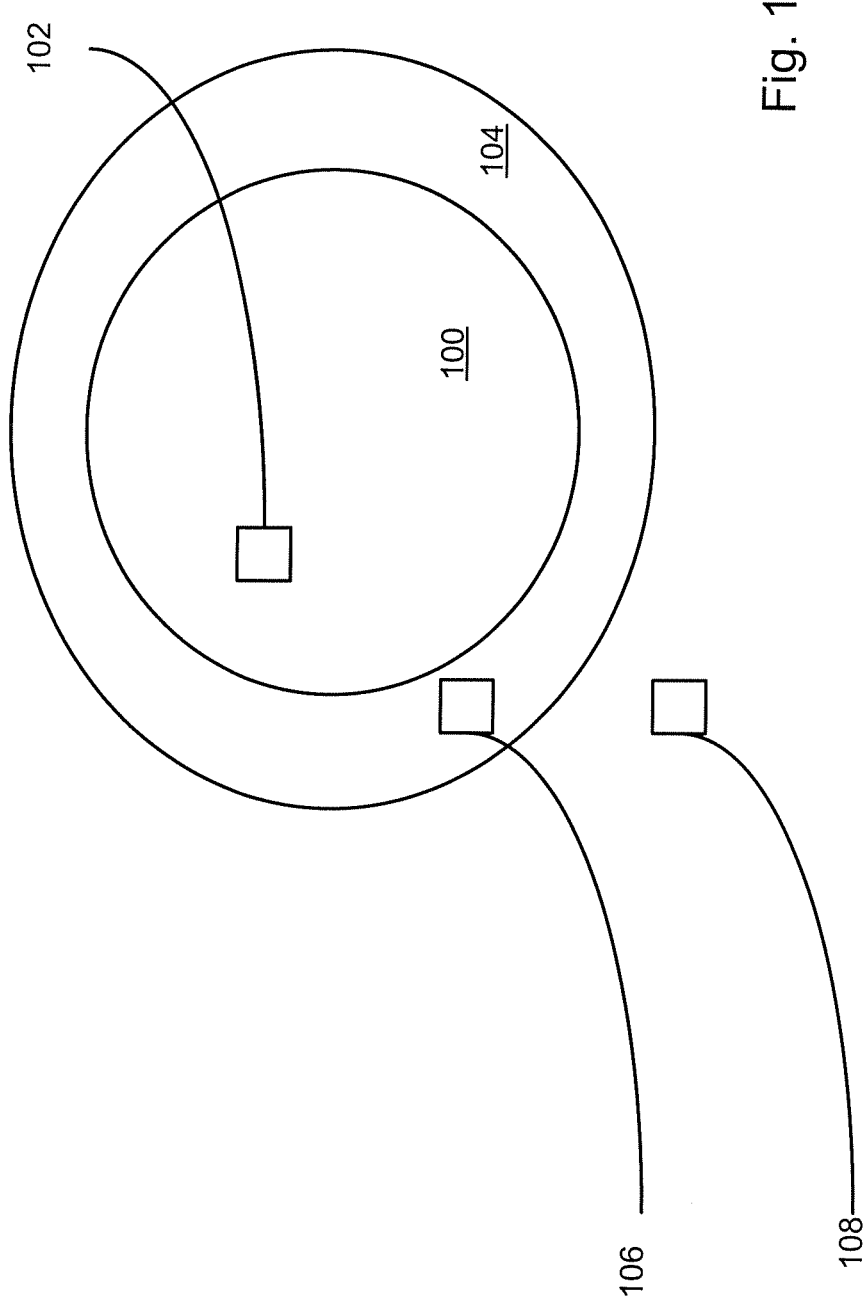
FIG. 1 illustrates an exemplary system implemented in accordance with various aspects.

In accordance with some aspects, cognitive radio senses the radio frequency (RF) spectrum with the goal of identifying unused spectrum. FIG. 1 illustrates a system including exemplary regions 100 and 104. In one or more aspects, a user device 106 that may be any wireless station e.g. an access point for a WLAN application, may be configured to operate using an 802.11, CDMA, WCDMA, OFDMA, or other communication protocol over all or part of a TV channel. The user device 106 may be a cognitive radio device. Further, in these aspects the station may be able to dynamically switch between one or more of the TV channels based upon the region that base station or subscriber station finds itself. For example, a laptop or consumer electronics device, e.g. a television, multimedia player, audio player, etc., may be configured to communicate by switching between these channels depending on where it is moved, e.g. a different city, state, or other geographic designation.

A cognitive radio device may identify spectrum in which it can operate. For example, in some embodiments a cognitive radio device can operate using one or more of the TV channels when they are available and is capable of scanning the spectrum, or predefined portions thereof depending on device parameters, and sense the presence of a licensed signal at a defined low signal to noise ratio (SNR). The reason for the potential of low SNR is that the cognitive radio may be in a faded location and must still be able to detect the licensed transmissions. As used herein, the low SNR is substantially, e.g. several dB, below the threshold to allow a TV receiver, e.g. receiver 102, to operate within the region 100 at the required gain, per the FCC or other regulatory body requirement.

In an aspect, spectrum sensing may be implemented by deploying a plurality of spectrum sensors deployed where a given unlicensed network or group of devices would operate, e.g. multiple devices 106 communicating with each other. The spectrum intelligence gathered by the spectrum sensors is fed to one or several processing platforms such as a network management station, e.g., an access point 108, or other device. In an aspect, the sensors may be implemented in devices that communicate according to different protocols, but in a similar area, e.g. consumer electronic, computing, and other appliances within a home or office. This would allow for a home or office network to be implemented for different data types, other than the primary protocol used for the device. For example, sensor data may be transmitted on other frequencies that the 802.11 frequencies used by computing or other devices, as well as those of television or other licensed transmissions in a given area.

Generally, spectrum sensing measurements with multiple distributed sensors that communicate to a single device may include information as to, one or more of:

Which channel to sense
How long to sense on the channel
How often to report sensing results. In some aspect, this may be only utilized where multiple cognitive radios report their sensing results to allow for a better view of the spectrum conditions, e.g. at a base station or access point.
Which type of signal to sense for
The sensing threshold In one or more aspects, different signal types to be sensed may include: (i) IEEE 802.22; (ii) ATSC; (iii) NTSC; (iv) Part 74; and (v) DVB. A cognitive radio may be able to sense one or more of the different signal types.

In aspect, where spectrum sensing reports are provided from multiple cognitive radios, the reports may be a single bit indicating if the signal was detected or a "value" indicating different information with respect to the spectrum.

Figure 2:
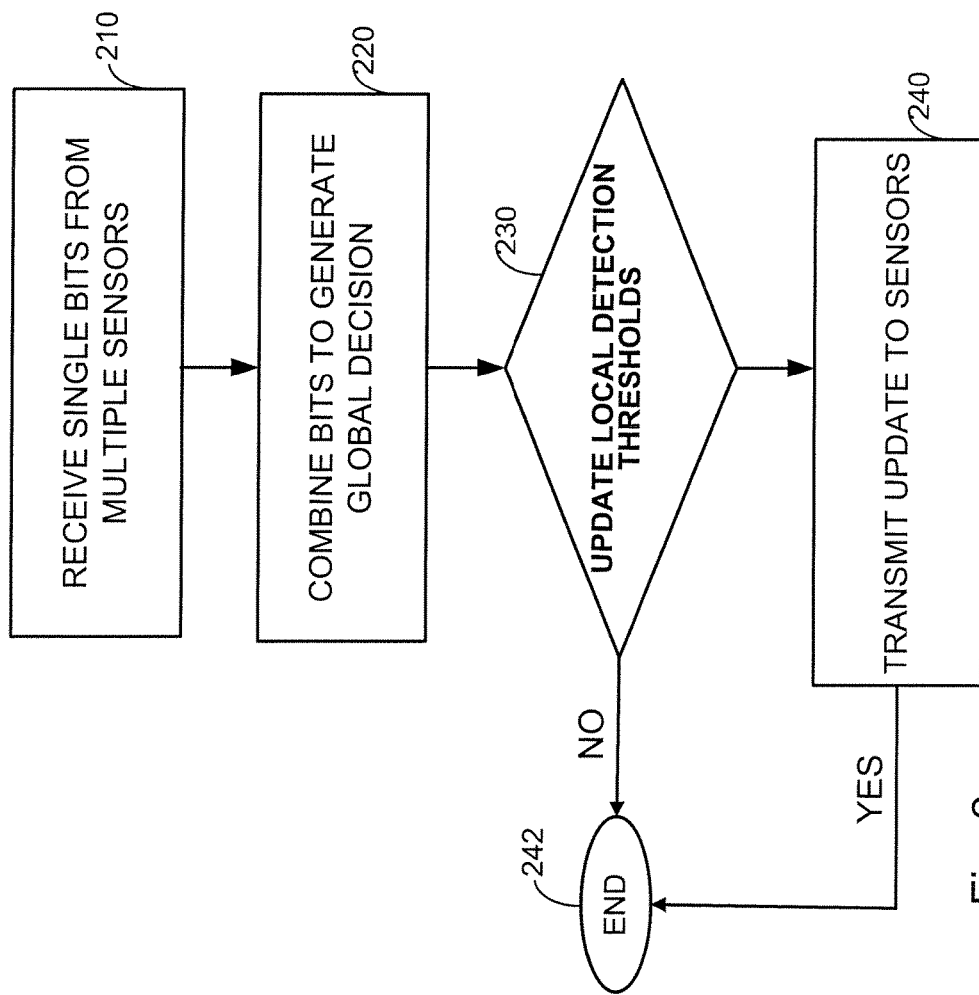
FIG. 2 illustrates the steps of a method used in some embodiments.

FIG. 2 shows steps 210, 220, 230, 240 and 242 performed in accordance with some aspects. In one aspect, individual sensors report a single bit indicating whether a specific signal type was detected in a given TV channel, or other channel as shown in step 210 (FIG. 2). The local decisions are combined into a global decision, as shown in step 220, at an access point or other server. There are multiple techniques for combining the local decisions into a global decision. In each approach the global false alarm rate depends on the techniques for combining local decisions into a global decision and on the local false alarm rate. Therefore, it is the false alarm rate at the local sensor may be adjustable and may be specified by the node in the network that is combining the local decisions into a global decision. This node in which the local decisions are combined is typically a base station or access point, but can be any node, i.e., device, in the network which is designated to combine local decisions into the global decision.

In an aspect, combining local decisions into a global decision is a voting scheme. For example, if the number of local decisions detecting the presence of a specified signal type exceeds a threshold then the global decision is that the signal is present, otherwise the global decision is that the signal is absent from the specified TV channel.

A decision is then made, as to whether update the local detection thresholds in step 230. If there is an update, then a message is sent to one or more devices to update their thresholds and or other information. This occurs in step 240. The local thresholds may be individually tailored for different sensors or may be used for all or some of the sensors. Operation is then shown ending in step 242 but it should be appreciated that the process and the steps shown in FIG. 2 are repeated over a period of time.

The message for setting the local probability of false alarm is shown in Table 1. The table shows the name of the message and the action that the receiving node will take ones it receives the message. This message is sent from the node making the global decision to each of the nodes making the local decisions.

TABLE 1

Set Local Probability of False Alarm Message

| Message | Action |
| --- | --- |
| Set Local Probability of False Alarm | Adjust the detection threshold to attain the specified local probability of false alarm |

Another message that may be used is one to specify the detection technique. There are many detection techniques that can be used. Each of the detection techniques relies on detecting a feature of the signal type that is to be sensed. For each signal type there are various signal features that can be used in the sensing technique. Here only some of the possible sensing techniques are listed. Others will be invented in the future, so the signaling messages will need to be expandable to allow for enumeration of future techniques.

The signaling to specify the sensing technique is shown in Table 2.

TABLE 2

Set Local Sensing Technique

| Message | Action |
| --- | --- |
| Set Local Sensing Technique | Set local sensing technique<br>Energy Detection<br>ATSC Pilot Power Detection<br>ATSC PN Sequence Detection<br>ATSC Pilot Spectrum Analysis Detection<br>Other, . . . |

This message may be an added block to the method of FIG. 2, e.g. along with updating the local threshold at block 240, or may be independent of this.

Beyond just reporting a single-bit decision as to whether a signal type was detected within a given channel, it is possible to supplement that bit report with a measure of the confidence of that decision, e.g. block 210 of FIG. 2 would include a confidence measure with the bit, or bits, and block 220 would include taking into the confidence measure associated with the bit, or bits, into the global decision. This may be thought of as analogous to soft decoding in a digital communication system. The detector reports not only a decision but a metric that indicates the confidence in this decision. Then the node combining all these local decisions into a global decision can weight the local decision based on the value of the confidence metric.

Based on the sensing technique that is used there are many ways that confidence value can be specified. In one aspect, if the test statistic used in the sensing technique just slightly exceeds the detector threshold a low confidence value would be assigned to the confidence metric. If the test statistic vastly exceeded the detector threshold then a high confidence value would be assigned to the confidence metric. Similarly, if the test statistic was just slightly under the detector threshold then a low confidence threshold would be assigned, while if the test statistic was much less than the detector threshold a high confidence value would be assigned.

The signaling for reporting sensing decisions with a confidence metric is shown in Table 3.

TABLE 3

Signaling of Report on Sensing of a Particular Signal Type in a Particular TV Channel

| Report | Value |
| --- | --- |
| Local Decision | A single bit indicating whether a signal was detected in the TV band or not detected in the TV band |
| Confidence | A value indicating the confidence of the local decision. |

In other aspects, more information, i.e. more than a bit or bits with a confidence measure, may be transmitted from each of the sensors to the sensor combining the information a better global decision can be made.

The region that specifies which ATSC TV receivers are protected from harmful interference is specified in terms of the field strength of the ATSC signal. Additionally, a keep-out region can be defined in terms of the ATSC field strength. Hence, a very useful piece of information is an estimate of the ATSC field strength at the sensor. Similarly, for other signal types an estimate of the field strength is also useful. Every estimator has an error associated with it. It is very useful at the node that makes the global decision to have not only the estimate of the field strength but also a measure of the estimation error. A typical measure of the estimation error is the variance of the error. As an alternative, the standard deviation of the estimator error can also be used, since it is just the square root of the variance of the error.

Given knowledge of the antenna gain and operating frequency (or wavelength) one can convert back and forth between the field strength and the signal power. Hence, an alternative value to be signaled is an estimate of the signal power, block 310, which in some aspects may include the measure of the estimation error. Given that the signal of interest (e.g. ATSC) may be very weak, it is not acceptable to use the typical receive signal strength indicator, since that is typically the sum of the signal power and the noise power. If the signal-to-noise ratio is large then RSSI is a reasonable metric, however, in spectrum sensing the system often operates with negative SNR, so use of RSSI is not an effective metric.

Mathematically let the field strength at the sensor be F. The estimate of the field strength at the sensor is $\hat{F}$. Then error in the estimate is given by, $$\tilde{F}=\hat{F}-F$$

The variance of the estimation error is given by, $$\sigma^2=E[\tilde{F}^2]=E[(\hat{F}-F)^2]$$

The signaling for reporting the field strength estimate and the variance of the estimator is given in Table 4.

TABLE 4

Signaling of Report Field Strength Estimate and Estimation Error

| Report | Value |
| --- | --- |
| Field Strength Estimate | An estimate of the field strength of the specified signal in the specified TV channel |
| Variance (or Standard Deviation) of Estimation Error | The variance (or standard deviation) of the estimation error |

A decision may then be made based upon the field strength information, block 320.

Figure 3:
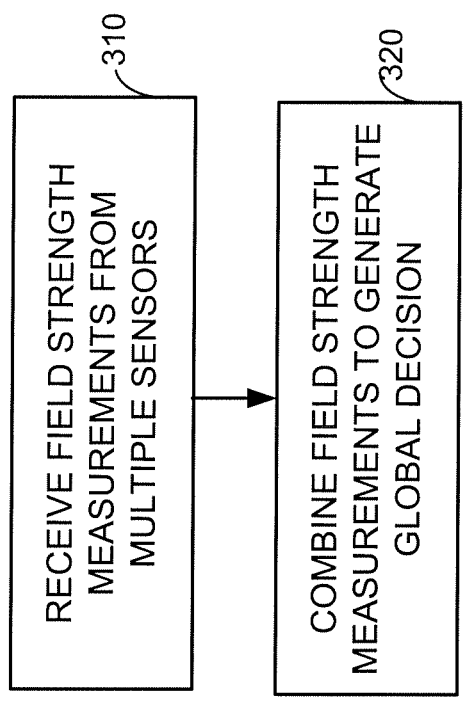
FIG. 3 illustrates the steps of a method used by a node receiving field strength measurements from multiple nodes in accordance with some aspects.
Figure 4:
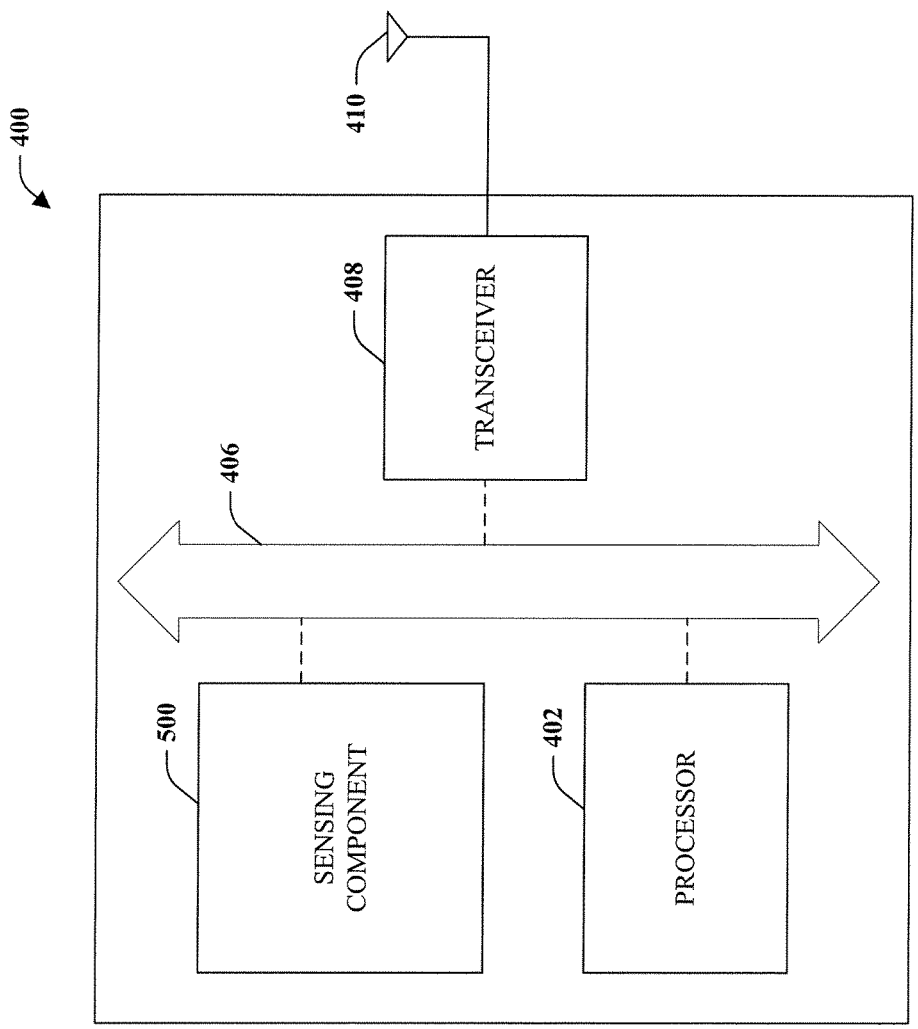
FIG. 4 illustrates a terminal, e.g., a station, which may be used to perform sensing operations, make a determination with regard to signal presence and report the determination to another node as well as receive determinations and other information from multiple nodes in the case where the illustrated device is acting as a control and/or decision node.

Referring to FIG. 4, a communication device 400, which may be a base station, access point, user device, terminal, access terminal, or any other device is depicted. The communication device 400 includes a sensing component 500 that senses spectrum, according to one or more of the techniques described above. Device 400 also includes a transceiver 408 and antenna 410 for communication with other devices. Processor 402 communicates with sensing component 500 and transceiver 408, via bus 406. Processor 402 performs the determination of spectrum as discussed with respect to FIGS. 2 and 3, with respect to a device that combines sensor data from multiple distributed sensors. Alternatively, it generates field strength measurements or confidence information with detection decisions for transmission in a sensor that provides information for distributed sensing.

Figure 5:
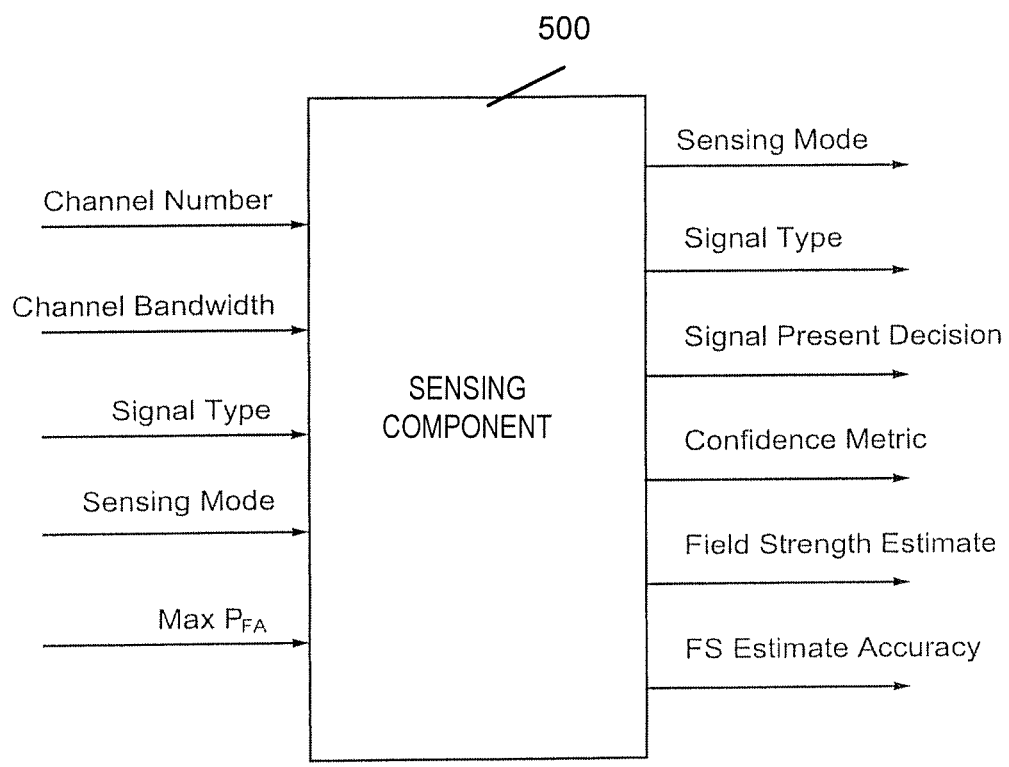
FIG. 5 illustrates a sensing component along with the inputs and outputs thereto which may be used in the terminal of FIG. 4 and in various terminals described in the present application.

FIG. 5 illustrates a sensing component along with the inputs and outputs thereto which may be used in the terminal of FIG. 4 and in various terminals described in the present application. The left side of FIG. 5 shows signal inputs while the right side shows outputs. The sensing component in the FIG. 5 embodiment generates the signal of interest presence decision while in other embodiments the decision is made by a module separate from the module which does the sensing.

Figure 6:
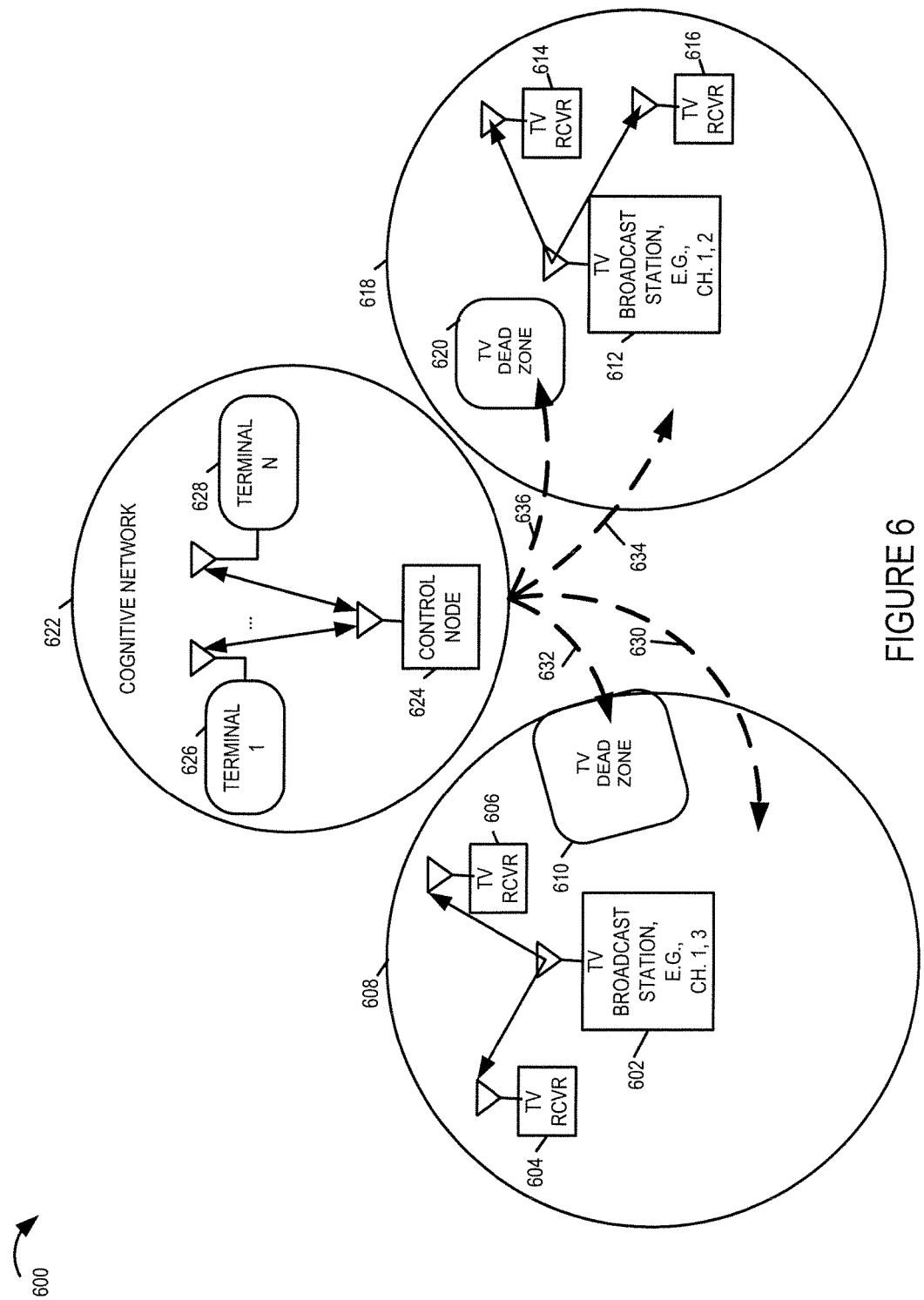
FIG. 6 illustrates an exemplary system implemented in accordance with some embodiments.

FIG. 6 is a drawing 600 including an exemplary cognitive network 622 which may utilize different portions of spectrum in different areas for wireless communications. Exemplary cognitive network 622 includes a control node and a plurality of terminals, (terminal 1 626, . . . , terminal N 628). In some embodiments, the control node 624 is an access node, e.g., a base station, or a cognitive network controller. In some embodiments, the terminals are access terminals, e.g., wireless terminals such as mobile nodes. In accordance with one aspect the cognitive network 622 implements distributed, coordinated, and/or collaborative spectrum sensing in deciding what portion of the spectrum is currently available for use in its current location.

In accordance with another aspect, the control node 624 makes a final spectrum usage decision based on received spectrum sensing information reports communicated from a plurality of distributed sensors, e.g., communicated from the plurality of terminals (626, . . . , 628) including sensors. In accordance with one exemplary feature, the control node 624 sends control information to the terminals (626, . . . , 628) to configure and/or adjust their spectrum sensing and/or reporting, e.g., a local sensing false alarm adjustment message, a local sensing technique command message, etc. In various embodiments, the false alarm setting adjustment information communicated from the control node 624 to the terminals (626, 628) is adjusted as a function of the number of terminals reporting spectrum sensing information to the control node 624. In some embodiments, the local sensing technique type communicated from the control node 624 to the terminals (626, 628) is selected as a function of the anticipated type of licensed spectrum signaling expected to be used in the region, if the spectrum portion is being used.

In accordance with another feature, a terminal (626, 628) reports its local decision information of its spectrum sensing in a report, e.g., a report message, including a local decision field and a confidence field. In accordance with still another feature the terminal (626, 628) sends a field strength report to the control node 624 including a field strength estimate value and a statistical parameter associated with the estimation error of the reported field strength value.

Drawing 600 of FIG. 6 also includes two exemplary TV broadcast stations (602, 612) situated at different locations and using different spectrum portions, e.g., in accordance with different spectrum licenses and/or different service provider decisions. For purposes of this example, assume that channel 1 is associated with a first spectrum portion, channel 2 is associated with a second spectrum portion, and that channel 3 is associated with a third spectrum portion, and that the three spectrum portions, e.g., three frequency bands, are non-overlapping.

TV broadcast station 602 broadcasts on channels 1 and 3. Circle 608 represents an outer boundary of the coverage region for TV broadcast station 602. However, within region 608, there are dead zones of coverage 610, e.g., due to obstructions, topology, reflections, shadowing, fading, multi-path consideration, etc. TV receivers (604, 606) in good reception areas may receive TV broadcast signals from TV broadcast station 602.

TV broadcast station 612 broadcasts on channels 1 and 2. Circle 618 represents an outer boundary of the coverage region for TV broadcast station 612. However, within region 618, there are dead zones of coverage 620. TV receivers (614, 616) in good reception areas may receive TV broadcast signals from TV broadcast station 612

Consider that the cognitive network is outside regions 608 and 618; the cognitive network may sense that the bands corresponding to channels 1, 2, and 3 are unused and available to be used by the cognitive network. If the cognitive network happens to be situated in region 608 but outside dead zone 610, as indicated by arrow 630, the cognitive network may sense that the frequency bands corresponding to channels 1 and 3 are unavailable to use but may sense that the frequency band corresponding to channel 2 is available to be used by the cognitive network 622. If the cognitive network happens to be situated in region in dead zone 610, as indicated by arrow 632, the cognitive network may sense that the frequency bands corresponding to channels 1, 2 and 3 are available to be used by the cognitive network 622. If the cognitive network happens to be situated in region 618 but outside dead zone 620, as indicated by arrow 634, the cognitive network may sense that the frequency bands corresponding to channels 1 and 2 are unavailable to use but may sense that the frequency band corresponding to channel 3 is available to be used by the cognitive network 622. If the cognitive network happens to be situated in dead zone 620, as indicated by arrow 636, the cognitive network may sense that the frequency bands corresponding to channels 1, 2 and 3 are available to be used by the cognitive network 622.

Figure 7:
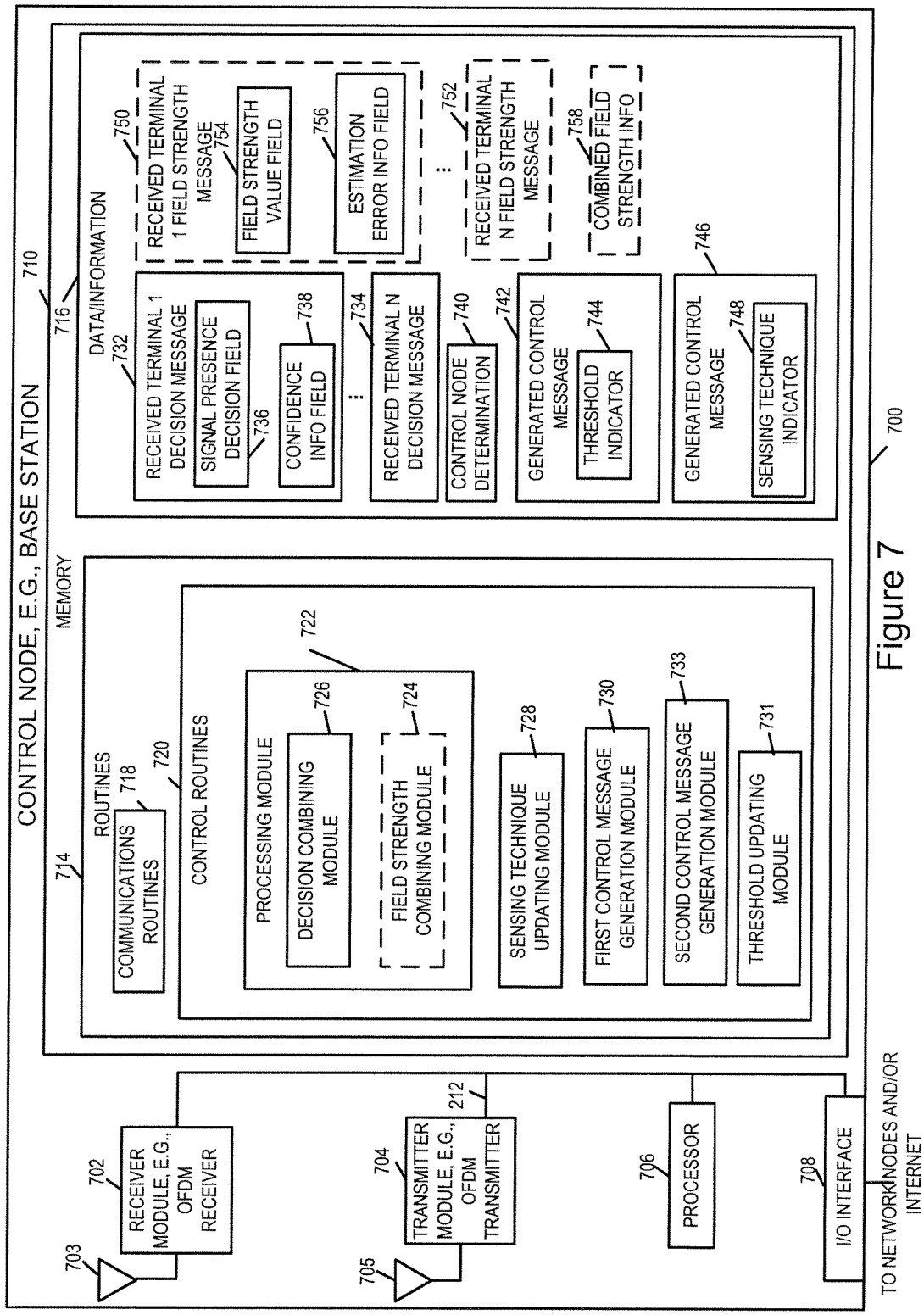
FIG. 7 illustrates a control node which may be used in the exemplary system shown in FIG. 6.

FIG. 7 is a drawing of an exemplary control node 700, e.g., base station, access node or cognitive network control node, in accordance with various embodiments. Exemplary control node 700 is, e.g., control node 624 of FIG. 6. Exemplary control node 700 includes a receiver module 702, e.g., an OFDM receiver, a transmitter module 704, e.g., an OFDM transmitter, a processor 706, an I/O interface 708, and memory 710 coupled together via a bus 712 over which the various elements may interchange data and information. Memory 710 includes routines 714 and data/information 716. The processor 706, e.g., a CPU, executes the routines 714 and uses the data/information in memory 710 to control the operation of the control node 700 and implement methods, e.g., the method of flowchart 1000 of FIG. 10.

The receiver module 702 is coupled to receive antenna 703 via which the control node receives signals from terminals. Received signals include, e.g., a message from a terminal communicating a spectrum channel presence determination and a confidence measure associated with the determination. Receiver module 702 receives a plurality of decision with respect to the presence of a signal of interest in a wireless channel spectrum, e.g., a licensed transmission signal in a wireless channel spectrum. Received messages (732, . . . , 734) represent messages conveying such decisions. Received signals also include, e.g., a message from a terminal communicating a field strength measurement value corresponding to a channel of interest and an associated reliability indicator of the measured field strength value. Received messages (750, . . . , 752) are examples of received field strength messages.

The transmitter module 704 is coupled to transmit antenna 705 via which the control node 700 transmits signals to terminals. Transmitted signals include, e.g., a control message indicating a sensing technique to be used by a terminal when determining whether a signal is present in a given channel of a spectrum. Transmitted signals also include control messages indicating a detection threshold to be used in determining whether a signal is present in a given channel of a spectrum. Exemplary transmitted control messages are messages 742 and 746.

I/O interface 708, included in some embodiments, couples the control node 700 to other network nodes and/or the Internet.

Routines 714 include communications routine 718 and control routines 720. The communications routine 718 implements the various communications protocols used by the control node 700. Control routines 720 include a processing module 722, a decision combining module 726, a sensing technique updating module 728, and a first control message generation module 730, a second control message generation module 733 and a threshold updating module 731. Processing module 722 includes a decision combining module 726. In some embodiments, the processing module 722 includes a field strength combining module 724.

Data/information 716 includes a plurality of received decision messages (received terminal 1 decision message 732, . . . , received terminal N decision message 734, a control node determination 740, a generated control message 742 including a threshold indicator 744, a generated control message 746 including a sensing technique indicator 748. In some embodiments, data/information 716 includes a plurality of messages conveying field strength information from different terminals (received terminal 1 field strength message 750, . . . , received terminal N field strength message 752). In some embodiments, data/information 716 includes combined field strength information 758. Received decision messages include a signal presence decision field and a confidence information field, e.g., message 732 includes signal presence decision field 736 and confidence information field 738. Received strength messages include a field strength value field and an associated estimation error information field, e.g., message 750 includes field strength value field, 754 and estimation error information filed 756.

Processing module 722 processes a plurality of received decisions to determine whether the wireless channel spectrum includes the signal of interest, e.g., the licensed transmission signal. Decision combining module 726 combines a plurality of one bit decisions and confidence information associated with each of the plurality of one bit decisions. Field strength combining module 724 combines a plurality of filed strength measurements used to make the signal presence determination. Combined field strength information 758 is an output of module 724. In some embodiments the processing comprises combining an estimation error associated with each of the field strength measurements to determine whether one or more channels of the spectrum include interfering licensed transmission.

Sensing technique updating module 728 determines when to send a sensing technique control signal to at least one device providing a determination. First control message generation module 730 generates a control message including a sensing technique indicator indicating a sensing technique to be used, e.g., message 746.

Second control message generation module 733 generates a control message including a threshold indicator providing information about a threshold to be used by the receiving device in making a decision with respect to the presence of a signal of interest in the wireless channel spectrum, e.g., message 742. Threshold updating module 731 determines when to send a threshold update signal to at least one device providing a determination. In some embodiments, the threshold updating module 731 makes a decision as a function of a change in the number of devices communicating signal presence signals to device 700.

In some embodiments, a control message is generated and transmitted which communicates both threshold indication information and sensing technique indicator information in a single message.

Figure 8:
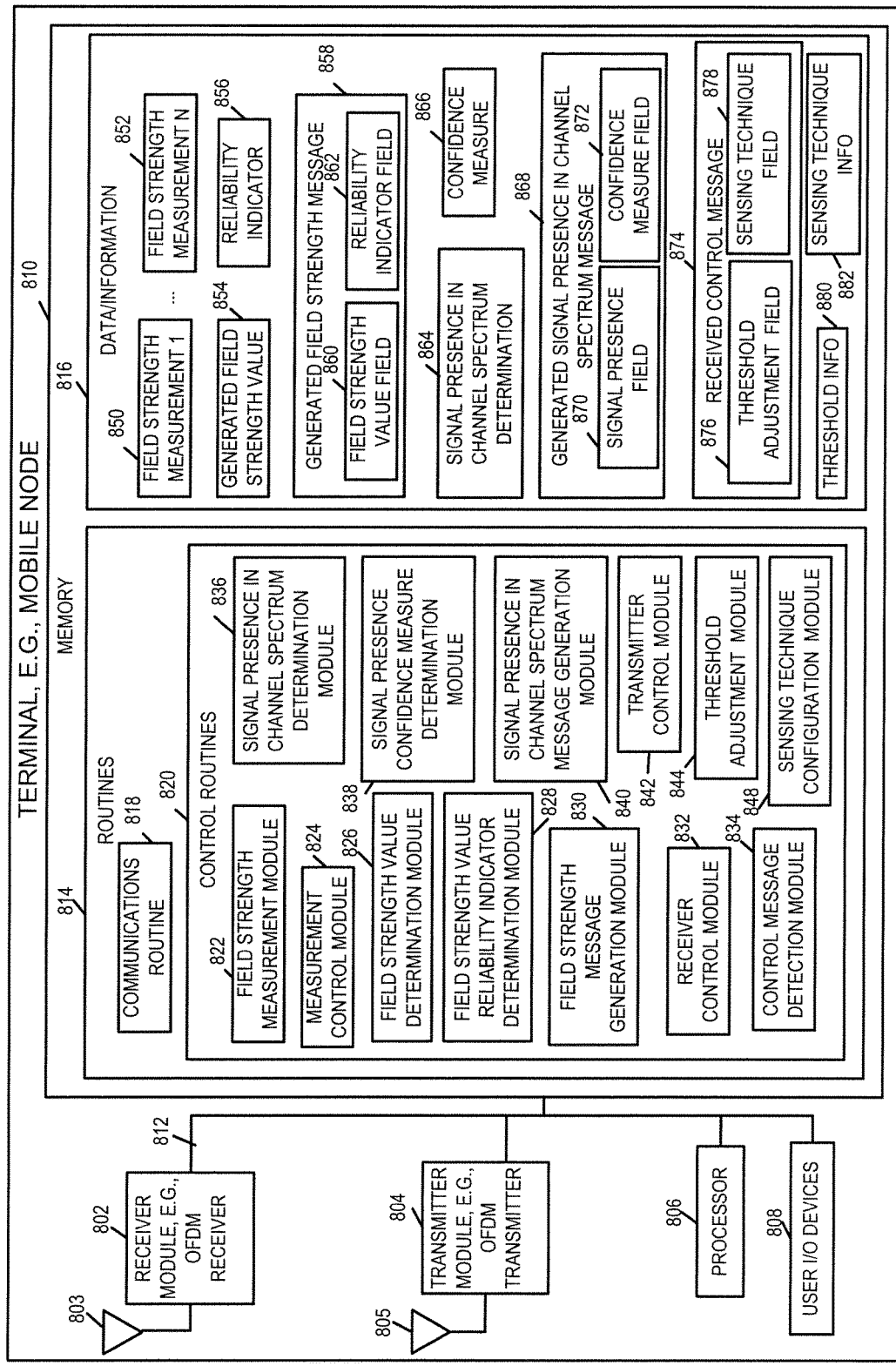
FIG. 8 illustrates a terminal, e.g., mobile node, which may be used in the exemplary system shown in FIG. 6.

FIG. 8 is a drawing of an exemplary terminal 800, e.g., mobile node, in accordance with various embodiments. Exemplary terminal 800 is, e.g., terminal 626 or 628 of FIG. 6. Exemplary terminal 800 includes a receiver module 802, e.g., an OFDM receiver, a transmitter module 804, e.g., an OFDM transmitter, a processor 806, user I/O devices 808, and memory 810 coupled together via a bus 812 over which the various elements may interchange data and information. Memory 810 includes routines 814 and data/information 816. The processor 806, e.g., a CPU, executes the routines 814 and uses the data/information 816 in memory 810 to control the operation of the terminal 800 and implement methods, e.g., the method of flowchart 900 of FIG. 9.

The receiver module 802 is coupled to receive antenna 803 via which the terminal receives signals from a control node. Received signals include, e.g., a control message indicating a sensing technique to be used by the terminal 800 when determining whether a signal is present in a given channel of a spectrum. Received signals also include a control message indicating a detection threshold to be used in determining whether a signal is present in a given channel of a spectrum.

The transmitter module 804 is coupled to transmit antenna 805 via which the terminal 800 transmits signals to a control node. Transmitted signals include, e.g., a message from terminal 800 communicating a spectrum channel presence determination and a confidence measure associated with the determination. Transmitted signals also include, e.g., a message from terminal 800 communicating a field strength measurement value corresponding to a channel of interest and an associated reliability indicator of the measured field strength value.

User I/O devices 808, include, e.g., a microphone, keyboard, keypad, switches, camera, display, speaker, etc. User I/O devices 808 allow a user of terminal 800 to input data/information, access output data/information and control at least some function of the terminal 800.

Routines 814 include communications routine 818 and control routines 820. The communications routine 818 implements the various communications protocols used by the terminal 800. Control routines 820 include a field strength measurement module 822, a measurement control module 824, a field strength value determination module 826, a field strength value reliability indicator determination module 828, a field strength message generation module 830, a receiver control module 832, a control message detection module 834, a signal presence in channel spectrum determination module 836, a signal presence confidence measure determination module 838, a signal presence in channel spectrum message generation module 840, a transmitter control module 842, a threshold adjustment module 844, and a sensing technique configuration module 848. Data/information 816 includes information corresponding to a plurality of field strength measurements (field strength measurement 1 850, . . . , field strength measurement N 852), a generated field strength value 854 and an associated reliability indicator 856, a generated field strength message 858 including a field strength value field 860 and a reliability indicator field 862, a signal presence in channel spectrum determination 864 and an associated confidence measure 866, a generated signal presence in channel spectrum message 868 including a signal presence field 870 and a confidence measure field 872, a received control message 874 including a threshold adjustment field 876 and a sensing technique field 878, threshold information 880 and sensing technique information.

Field strength measurement module 822 measures the field strength of a signal of interest, e.g., a pilot signal, in a wireless channel spectrum. Measurement control module 824 controls the field strength measurement module 822 to perform multiple measurements of the signal of interest over a period of time. Measurements (850, . . . , 852) represents outputs of the field strength measurement module 822. Field strength value determination module 826 generates a measured field strength value from the multiple measurements of the signal of interest, e.g., an average value or a filtered value. Measurements (852, . . . 852) represents inputs to field strength value determination module 826, while generated filed strength value 854 is an output of module 826. Field strength value reliability indicator determination module 828 generates an indicator of the reliability of the measured field strength value, e.g., one of a variance and a standard deviation generated from multiple field strength measurements. Reliability indicator 856 is an output of reliability indicator determination module 828. Field strength message generation module 830 generates a field strength message, e.g., generated field strength message 858, wherein the field strength value field 860 conveys the generated field strength value 854 and wherein the reliability indicator field 862 conveys the generated reliability indicator 856. Transmitter control module 842 controls the wireless transmitter module 804 to transmit the generated field strength message 858 to a control node.

Signal presence in channel spectrum determination module 836 determines whether a signal of interest is present in a wireless channel spectrum. In various embodiments, the signal of interest is a television signal. Signal presence in channel spectrum determination 864 is an output of module 836. Signal presence confidence measure determination module 838 determines a confidence measure corresponding to a signal presence determination of module 836. Confidence measure 866 is an output of confidence measure determination module 838 and corresponds to the signal presence determination of information 864. Signal presence in channel spectrum message generation module 840 generates a message conveying the signal presence determination and associated confidence level information for the determination, e.g., message 868. Signal presence field 870, which conveys the signal presence in channel spectrum determination 864, is, in some embodiments, a single bit field indicating whether or not the signal of interest was determined to be present. The confidence measure field communicates confidence measure value 866 and is a field of at least one bit. In some embodiments, the confidence measure field size exceeds the signal presence field size, e.g., signal presence field is a single bit field and the confidence measure field 872 is a multi-bit field. Transmitter control module 842 also controls the transmitter module 804 to transmit the generated signal presence in channel spectrum message 868 over an airlink to another device, e.g., to a control node.

Control message detection module 834 is for detecting the presence of a control signal including one or both of: (i) information indicating a sensing technique to be used to determine the presence of a signal of interest and (ii) a threshold used for determining the presence of a signal of interest, e.g., a false alarm setting threshold. Ion some embodiments, the sensing technique is a sensing technique in a group of sensing techniques including energy detection, ATSC Pilot Power Detection, ATSC PN Sequence Detection, and ATSC Pilot Spectrum Analysis Detection. The control message can be an initialized message or a change message. Receiver control module 832 controls the receiver module 802 to receive control messages including messages communicating threshold adjustment information and/or sensing technique commands. Received control message 874 is a such a message which has been received by receiver 802 under the control of module 832 and detected by control message detection module 834. Threshold information 880 represents information corresponding to information recovered from the threshold adjustment field 876, while sensing technique information 882 represents information corresponding to information recovered from the sensing technique field 878. Threshold adjustment module 844 adjusts threshold criteria, e.g., a false alarm setting criteria, used by signal presence in channel spectrum determination module 836 in response to a received control message 874 indicating a change conveyed by the threshold adjustment field value. Sensing technique configuration module 848 configures the signal presence in channel spectrum determination module 836 to use the sensing technique indicated by information in the sensing technique field of the received control message 874.

Figure 9:
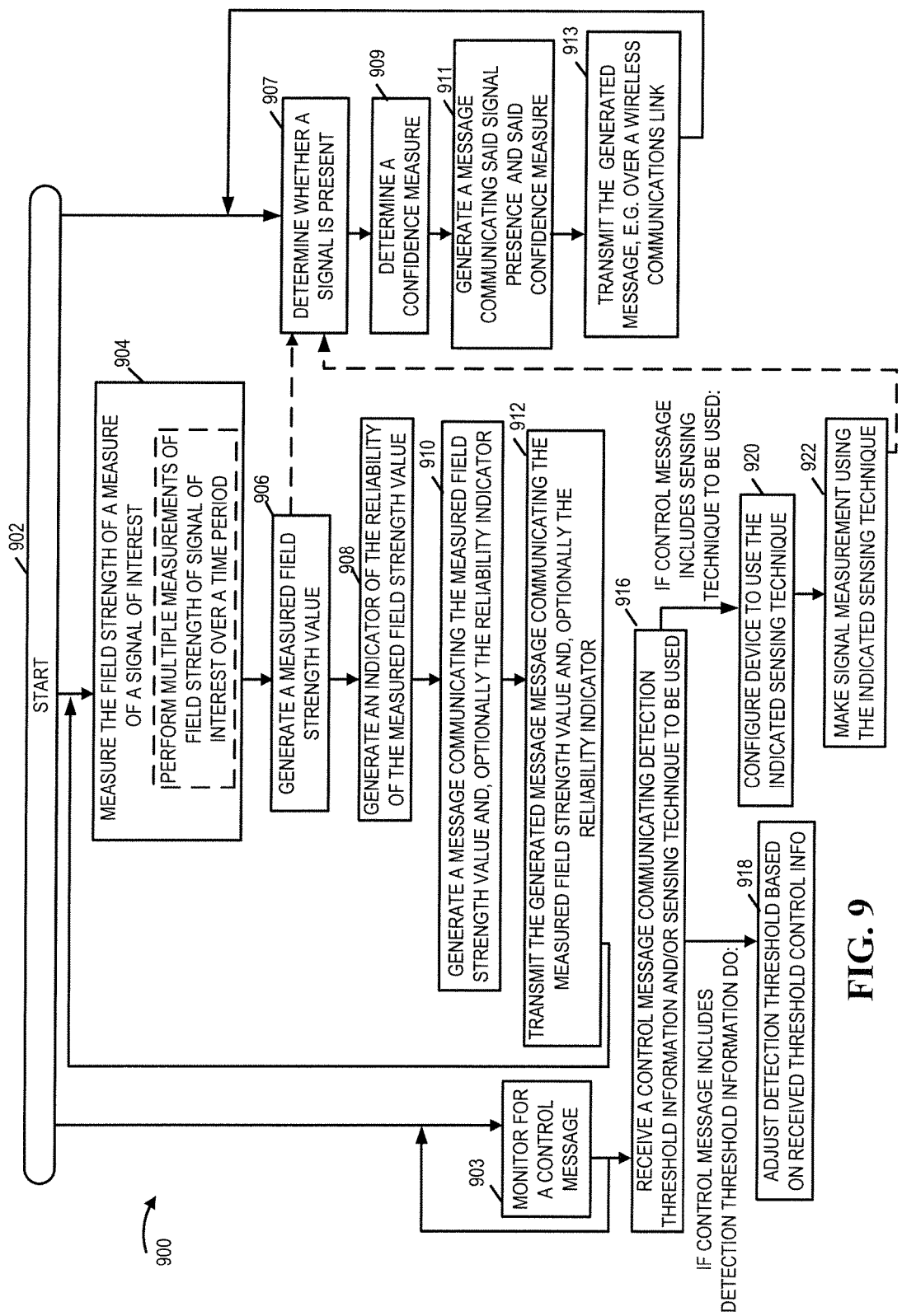
FIG. 9 illustrates an exemplary method of operating a wireless terminal in accordance with various aspects.

FIG. 9 illustrates the steps 900 of a method of operating a wireless terminal in accordance with an exemplary embodiment. The method begins in start step 902, e.g., when the wireless terminal is turned on. From start step 902 operation proceeds along three parallel paths. The first path starts with step 903 in which the wireless terminal monitors for a control message, e.g., from a control node. The monitoring is performed on an ongoing basis as indicated by the arrow from the bottom of step 903 extending back to the top of step 903. Operation proceeds from step 903 to step 916 when a control message is received by the wireless terminal's receiver. In step 916 a control message communicating detection threshold information and/or a sensing technique to be used is received and the action to be taken is determined based on the content of the received message. If the received message is a control message including detection threshold information, operation proceeds to step 918 in which the wireless terminal adjusts a detection threshold based on threshold control information included in the received message. The change may be to increase or lower the detection threshold depending on the received information. The received information may instruct the wireless terminal to increase or decrease a threshold by an indicated amount, set the threshold to a particular value or to adjust the threshold to achieve a target false detection rate specified in the control message. Other control information and/or commands are also possible, with these being but a few examples.

If in step 916 it was determined that the received control message included sensing control information, e.g., if it indicates a sensing technique to be used, operation proceeds to step 920. In step 920 a sensor device in the wireless terminal is configured, e.g., under control of a configuration control module, to implement the indicated sensing technique. Operation then proceeds to step 922 wherein the sensor device configured in accordance with the control message makes a signal measurement using the indicated sensing technique. The result of the measurement generated in step 922 is supplied, in some embodiments, to determination step 907 wherein the result of the signal sensing operation is used, depending on the embodiment, to determine whether the signal of interest is present in the wireless channel spectrum in which the signal measurement is made. The sensing technique may include a field strength measurement technique based on a power measurement, another energy detection technique, an ATSC pilot power detection method, an ATSC PN Sequence based detection technique, and an ATSC Pilot Spectrum Analysis Detection technique to mention but a few possible sensing techniques that may be used.

Operation proceeds from start step 902 along the second of the parallel paths to step 904. In step 904 a measurement of the field strength of a signal of interest, e.g., a TV signal or wireless microphone signal in a licensed television channel spectrum is measured. The measurement may involve multiple measurements of the field strength of the signal of interest over a time period with the multiple measurements being used to provide the measure of the field strength output by step 904. In step 906, the measured field strength produced in step 904 is used to generate a measured field strength value. This value may be communicated to the control node and/or used in making the determination as to whether a signal is present which occurs in step 907.

In step 908 an indicator of the reliability of the measured field strength value is generated. The indicator may, and in some embodiments does, communicate the accuracy of the measured field strength. In some embodiments the reliability indicator is a variance while in other embodiments it is a standard deviation of the field strength measurement.

Operation proceeds from step 908 to step 910 in which a message is generated to communicate the measured field strength value and, optionally, the reliability of the measured field strength value. Then, in step 912, the generated message is transmitted to thereby communicate the measured field strength value and the reliability indicator to the control node. The transmission maybe done by a wireless transmitter and may be over a wireless communications link. Operation proceeds from step 912 to step 902 with the measurements being performed in a repetitive manner over time.

Operation from start step 902 proceeds along the third parallel processing path to step 907 wherein a determination of whether a signal is present in the channel spectrum is made. The determination may be made in a plurality of ways, e.g., based on the detected field strength of the signal of interest and/or based on other sensed signal features. Following the determination, operation proceeds to step 909 where a confidence measure is determined. This measure indicates the reliability of the determination made in step 907 and can be used to indicate how much weight should be given to the determination of step 907.

In step 911 a message is generated which communicates the signal presence determination made in step 907 and the confidence measure generated in step 911. In some embodiments the signal presence is communicated using a single bit value, e.g., with a 0 indicating a determination that the signal of interest is present and a 1 indicating a determination that the signal of interest is not present. While a single bit value may be used to communicate the confidence measure, in several but not necessarily all embodiments a multi-bit confidence measure is included in the message generated in step 911. The message generated in step 911 is then transmitted in step 913, e.g., by a wireless transmitter over a wireless communications link.

While some information is shown as being communicated in different messages in the FIG. 9 embodiment, it should be appreciated that the different types of information can, and in some embodiments is, included in a single message which is transmitted, e.g., to a control node.

Operation is shown proceeding from step 913 back to step 907 to show that the signal presence determination and message transmission steps are repeated over time. The sensing and/or thresholds may change as the sensing and thresholds are updated, e.g., in response to received control messages.

As with the communication of information to the control node, it should be appreciated that the control messages may include sensing information, threshold information or a combination of sensing and threshold control information depending on the embodiment.

Figure 10:
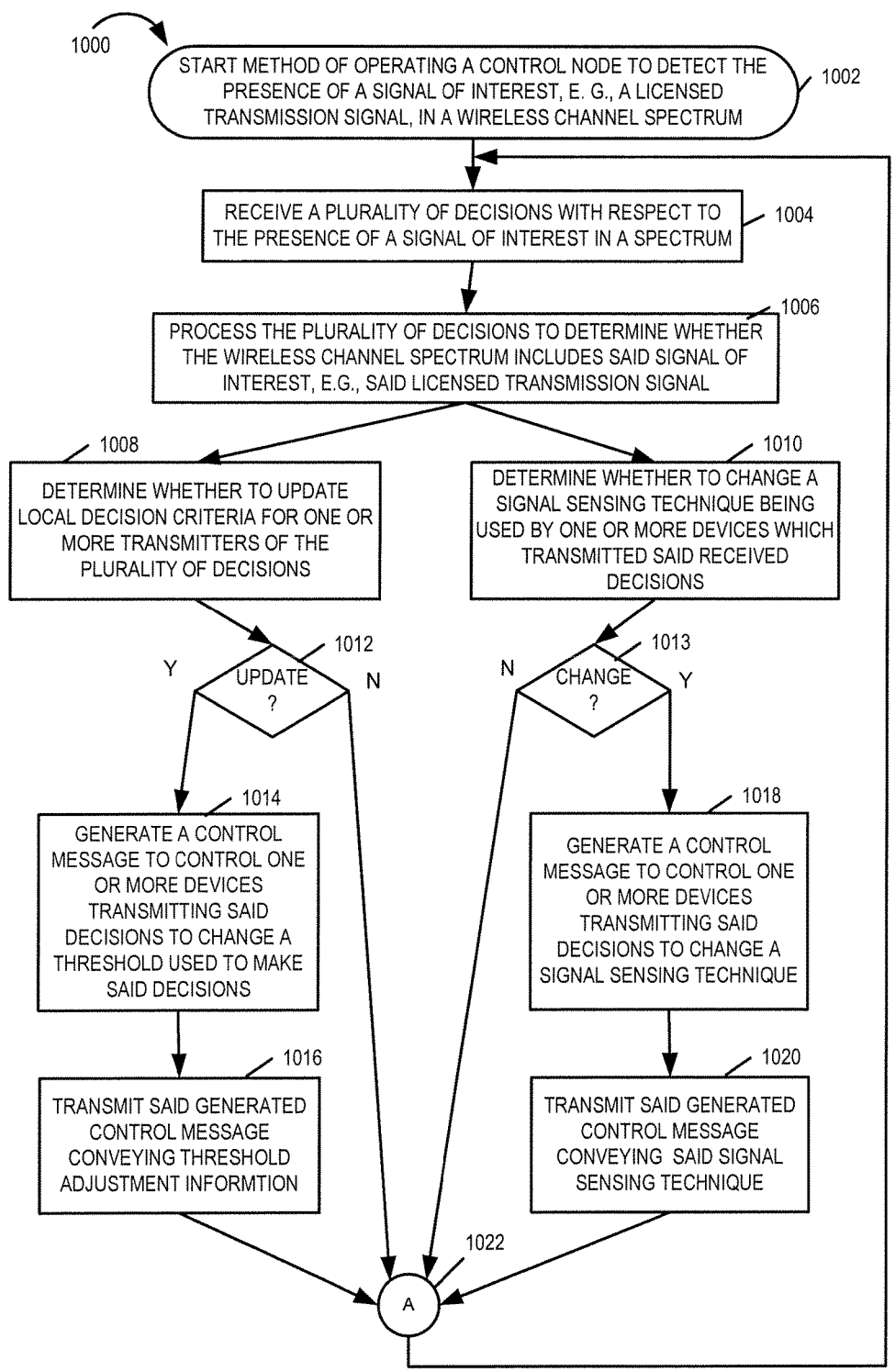
FIG. 10 illustrates an exemplary method of operating a control node, e.g. base station, in accordance with various aspects.

FIG. 10 is a flowchart 1000 of an exemplary method of operating a control node to detect the presence of a signal of interest, e.g., a licensed transmission signal, in a wireless channel spectrum. The exemplary control node is, e.g., device 700 of FIG. 7 or device 624 of FIG. 6.

Operation starts in step 1002 where the control node is powered on and initialized and proceeds to step 1004. In step 1004 the control node receives a plurality of decisions with respect to the presence of a signal of interest in a spectrum. In some embodiments a decision from a terminal is communicated to the control node in a message which also includes a confidence measure associated with the signal presence decision.

Operation proceeds from step 1004 to step 1006. In step 1006 the control node processes the plurality of decisions to determine whether the wireless channel spectrum includes the signal of interest, e.g., the licensed transmission signal. In some embodiments, the processing includes combining said decisions using an ORing operation. In some embodiments, the processing includes combining a plurality of one bit decisions and confidence information associated with each of the plurality of one bit decisions. In various embodiments, the processing includes combining a plurality of field strength measurements. In some such embodiments, the processing further comprises combining an estimation error associated with each of the field strength measurement to determine whether one or more channels of the spectrum include interfering licensed transmission. Operation proceeds from step 1006 to steps 1008 and 1010.

In step 1008 the control node determines whether to update local decision criteria for one or more transmitters of the plurality of decisions. In some embodiments, determining whether to update local decision criteria for one or more transmitters comprises determining to update in response to an increase in the number of device providing decisions over the number of device previously providing decisions. In some embodiments, determining whether to update local decision criteria for one or more transmitters comprises determining, on an individual basis, whether to update local decision criteria for each individual transmitter of a received decision. Then, in step 1012, if the decision of step 1008 is to update, operation proceeds from step 1012 to step 1014. However, if the decision is not to update, then operation proceeds from step 1012 to connecting node A 1022.

Returning to step 1014, in step 1014 the control node generates a control message to control one or more device transmitting said decisions to change a threshold used to make decisions. In some embodiments, the generated control message increases a detection threshold used by devices providing decisions when the number of devices providing decisions has increased over the number of devices previously providing decisions. Then, in step 1016 the control node transmits the generated control message conveying the threshold adjustment information. Operation proceeds from step 1016 to connecting node A 1022.

Returning to step 1010, in step 1010 the control node determines whether to change a signal sensing technique being used by one or more devices which transmitted said received decisions. Then, in step 1013, if the decision is to change, operation proceeds from step 1013 to step 1018; otherwise operation proceeds from step 1013 to connecting node A 1022.

Returning to step 1018, in step 1018 the control node generates a control message to control one or more devices transmitting said decisions to change a signal sensing technique. Then, in step 1020, the control node transmits the generated control message conveying the signal sensing technique. Operation proceeds from step 1020 to connecting node A 1022.

Operation proceeds from connecting node A 1022 to step 1004 where another plurality of decisions are received.

In some embodiments, a control message which is generated and transmitted conveys both local decision criteria update information and signal sensing technique configuration information, e.g., instead of using individual messages.

The techniques described herein may be implemented by various means. For example, these techniques may be implemented in hardware, software, or a combination thereof. For a hardware implementation, the processing units for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that include the instructions that may be implemented by one or more processors to perform the functions described herein. The instructions may be stored in memory units, e.g. a memory in a wireless device, on a removable media, or the like that may be read and executed by one or more processors (e.g., controllers). The memory unit(s) may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, signal processing, a decision step, message generation, message signaling, switching, reception and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

At least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of providing information which can be used to determine if a wireless channel spectrum is available for unlicensed wireless use, the method comprising:

performing multiple field strength measurements, over a time period, of a licensed signal in said wireless channel spectrum;

generating a measured field strength value from said multiple field strength measurements of the licensed signal;

generating an indication of a reliability of the measured field strength value, wherein said indication includes one of a variance or a standard deviation generated from the multiple field strength measurements, wherein the indication of the reliability of the measured field strength value is calculated based on:

$$\sigma^2 = E[\tilde{F}^2] = E[(\hat{F}-F)^2],$$

wherein $\hat{F}$ denotes the multiple field strength measurements as measured at a spectrum sensor, F denotes an actual field strength at the spectrum sensor, $\tilde{F}$ denotes an estimation error, σ denotes the standard deviation in the estimation error, and $\sigma^2$ denotes the variance in the estimation error; and transmitting the measured field strength value and said indication of the reliability of the measured field strength value to a control node to facilitate a determination as to whether the wireless channel spectrum is unused licensed wireless channel spectrum that is available for unlicensed wireless use.

2. An apparatus for providing information which can be used to determine if a wireless channel spectrum is available for unlicensed wireless use, the apparatus comprising:

a field strength measurement module for performing multiple field strength measurements of a licensed signal;

a measured field strength value generation module for generating a measured field strength value from said multiple field strength measurements of the licensed signal;

a reliability indicator generation module for generating a reliability indicator value indicating a reliability of the measured field strength value, wherein said reliability indicator generation module generates one of:

i) a variance, or ii) a standard deviation from said multiple field strength measurements, wherein the reliability indicator value is calculated based on:

$$\sigma^2 = E[\tilde{F}^2] = E[(\hat{F}-F)^2],$$

wherein $\hat{F}$ denotes the multiple field strength measurements as measured at a spectrum sensor, F denotes an actual field strength at the spectrum sensor, $\tilde{F}$ denotes an estimation error, σ denotes the standard deviation in the estimation error, and $\sigma^2$ denotes the variance in the estimation error; and a transmitter for transmitting the generated field strength value and the reliability indicator value to a control node to facilitate a determination as to whether the wireless channel spectrum is unused licensed wireless channel spectrum that is available for unlicensed wireless use.

3. The apparatus of claim 2, wherein the apparatus further includes a processor.

4. An apparatus for providing information which can be used to determine if a wireless channel spectrum is available for use, the apparatus comprising:

field strength measurement means for performing multiple field strength measurements of a licensed signal;

means for generating a measured field strength value from said multiple field strength measurements of the licensed signal;

means for generating a reliability indicator value indicating a reliability of the measured field strength value, wherein said generating the reliability indicator value generates one of:

i) a variance, or ii) a standard deviation from said multiple field strength measurements, wherein the reliability indicator value is calculated based on:

$$\sigma^2 = E[\tilde{F}^2] = E[(\hat{F}-F)^2],$$

wherein $\hat{F}$ denotes the multiple field strength measurements as measured at a spectrum sensor, F denotes an actual field strength at the spectrum sensor, $\tilde{F}$ denotes an estimation error, σ denotes the standard deviation in the estimation error, and $\sigma^2$ denotes the variance in the estimation error; and transmitter means for transmitting the generated field strength value and the reliability indicator value to a control node to facilitate a determination as to whether the wireless channel spectrum is unused licensed wireless channel spectrum that is available for unlicensed wireless use.

5. A non-transitory computer readable medium embodying computer executable instructions for controlling a device to provide information which can be used to determine if a wireless channel spectrum is available for unlicensed wireless use, the computer executable instructions, when executed by a processor, cause the device to perform operations comprising:

performing multiple field strength measurements, over a time period, of a licensed signal in said wireless channel spectrum;

generating a measured field strength value from said multiple field strength measurements of the licensed signal;

generating a reliability indicator value indicating a reliability of the measured field strength value, wherein said generating the reliability indicator value generates one of:

i) a variance, or ii) a standard deviation from said multiple field strength measurements, wherein the reliability indicator value is calculated based on:

$$\sigma^2 = E[\tilde{F}^2] = E[(\hat{F}-F)^2],$$

wherein $\hat{F}$ denotes the multiple field strength measurements as measured at a spectrum sensor, F denotes an actual field strength at the spectrum sensor, $\tilde{F}$ denotes an estimation error, σ denotes the standard deviation in the estimation error, and $\sigma^2$ denotes the variance in the estimation error; and transmitting the measured field strength value and the reliability indicator value to a control node to facilitate a determination as to whether the wireless channel spectrum is unused licensed wireless channel spectrum that is available for unlicensed wireless use.

* * * * *